(12) United States Patent
Li et al.

(10) Patent No.: US 10,142,427 B2
(45) Date of Patent: *Nov. 27, 2018

(54) SYSTEMS AND METHODS FOR SERVICE AND SESSION CONTINUITY IN SOFTWARE DEFINED TOPOLOGY MANAGEMENT

(71) Applicant: Huawei Technologies Co., Ltd., Shenzhen (CN)

(72) Inventors: Xu Li, Nepean (CA); Jaya Rao, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/470,493

(22) Filed: Mar. 27, 2017

(65) Prior Publication Data

US 2017/0289270 A1 Oct. 5, 2017

Related U.S. Application Data

(60) Provisional application No. 62/315,768, filed on Mar. 31, 2016.

(51) Int. Cl.
*H04L 29/08* (2006.01)
*H04W 36/08* (2009.01)
(Continued)

(52) U.S. Cl.
CPC .......... *H04L 67/148* (2013.01); *H04W 36/08* (2013.01); *H04W 36/22* (2013.01); *H04W 36/32* (2013.01); *H04W 64/006* (2013.01)

(58) Field of Classification Search
CPC .. H04L 67/148; H04W 64/006; H04W 36/32; H04W 36/08; H04W 36/22
(Continued)

(56) References Cited

U.S. PATENT DOCUMENTS

2002/0150091 A1* 10/2002 Lopponen ........... H04L 12/1818
370/389
2004/0053627 A1* 3/2004 Fiter ................. H04W 36/0055
455/456.1
(Continued)

FOREIGN PATENT DOCUMENTS

CN 101094096 A 12/2007
CN 101452406 A 6/2009
(Continued)

OTHER PUBLICATIONS

3GPP TR 22.864: "Feasibility Study on New Services and Markets Technology Enablers—Network Operation," Feb. 2016.
(Continued)

*Primary Examiner* — Babar Sarwar

(57) ABSTRACT

Embodiments of the present invention provide systems and methods for a Session-level SDT component in the control plane to handle setup, recovery and mobility of individual session requests in real time. The Session-level SDT component may comprise path management that performs either stateless of stateful path switching for an ongoing session, whether download or uplink, according to the stateful requirements of the session. The path management may be in conjunction with user equipment mobility management operation; it may also be in conjunction with network scalability and automation operation, such as load balancing.

6 Claims, 16 Drawing Sheets

(51) Int. Cl.
*H04W 36/22* (2009.01)
*H04W 36/32* (2009.01)
*H04W 64/00* (2009.01)

(58) Field of Classification Search
USPC ... 455/422.1, 436, 435.2, 456.1, 552.1, 440, 455/444, 455
See application file for complete search history.

(56) References Cited

U.S. PATENT DOCUMENTS

| | | | |
|---|---|---|---|
| 2004/0081128 A1* | 4/2004 | Fiter | H04W 36/10 370/338 |
| 2004/0120474 A1* | 6/2004 | Lopponen | H04M 3/42 379/88.17 |
| 2005/0141541 A1* | 6/2005 | Cuny | H04L 65/4061 370/437 |
| 2005/0260988 A1* | 11/2005 | Kauppinen | H04W 4/08 455/435.3 |
| 2010/0080186 A1* | 4/2010 | Guo | H04W 28/08 370/329 |
| 2011/0060837 A1* | 3/2011 | Zhai | H04W 76/10 709/227 |
| 2013/0246846 A1* | 9/2013 | Oyman | H04W 4/06 714/18 |
| 2014/0362730 A1* | 12/2014 | Zhang | H04L 45/64 370/254 |
| 2015/0026362 A1* | 1/2015 | Guichard | H04L 45/30 709/242 |
| 2015/0327284 A1* | 11/2015 | Wakabayashi | H04B 7/0632 370/252 |
| 2016/0203025 A1 | 7/2016 | Yao | |
| 2016/0212652 A1* | 7/2016 | Iwai | H04W 4/70 |
| 2016/0337915 A1* | 11/2016 | Tan | H04W 36/0083 |
| 2017/0150420 A1* | 5/2017 | Olsson | H04W 40/248 |
| 2018/0167954 A1* | 6/2018 | Wakabayashi | H04B 7/0632 |

FOREIGN PATENT DOCUMENTS

| | | |
|---|---|---|
| CN | 101568150 A | 10/2009 |
| CN | 104335175 A | 2/2015 |
| GB | 2530523 A | 3/2016 |
| WO | 2014166399 A1 | 10/2014 |
| WO | 2014197778 A1 | 12/2014 |
| WO | 2016007897 A1 | 1/2016 |

OTHER PUBLICATIONS

3GPP TR 22.891: "Study on Architecture for Next Generation System," Feb. 2016.
ETSI GS NFV-REL 002 V1.1.1 (Sep. 2015) "Network Functions Virtualisation (NFV); Reliability; Report on Scalable Architectures for Reliability Management" Group specification.
International Search Report dated Jun. 14, 2017 for corresponding International Application No. PCT/CN2017/078733 filed Mar. 20, 2017.
3rd Generation Partnership Project; Technical Specification Group Services and System Aspects; 3GPP TR 23.799 V0.3.0. (Mar. 2016) Study on Architecture for Next Generation System (Release 14) Mar. 14, 2016.
International Search Report dated Jun. 5, 2017 for corresponding International Application No. PCT/CN2017/078843 filed Mar. 30, 2017.
International Search Report dated May 27, 2017 for corresponding International Application No. PCT/CN2017/078886 filed Mar. 30, 2017.
China Mobile, S2-160956: Solution for Enabling (Re) Selection of Efficient User Plane Paths. SA WG2 Meeting #113AH. Feb. 26, 2016.

* cited by examiner

SYSTEMS AND METHODS FOR SERVICE AND SESSION CONTINUITY IN SOFTWARE DEFINED TOPOLOGY MANAGEMENT

CROSS-REFERENCE TO RELATED APPLICATIONS

This application claims the benefit of U.S. Provisional Application Ser. No. 62/315,768 titled "Systems and Methods for Software Defined Topology Management" filed on Mar. 31, 2016, which is incorporated by reference herein in its entirety.

TECHNICAL FIELD

This disclosure relates to systems and methods for software defined topology (SDT), and, in particular, to systems and methods for service and session continuity in SDT management.

BACKGROUND

In conventional communication networks, a topology is defined by the location of nodes and the links that interconnect them. As nodes and functions are virtualized, and as logical links can be created between virtualized nodes, the topology of a network, which was once defined solely by the arrangement of physical resources, can be defined by network management entities. Software Defined Topology (SDT), along with other technologies such as Software Defined Networking (SDN), is considered as an enabling technology for the dynamic creation and management of networks. In the context of a next generation network, such as a so-called fifth generation (5G) wireless networks, an SDT management entity can be employed to generate/determine a network logical topology for each service, including (1) virtual function (VF) points of presence (PoP) decision, i.e., physical locations (network addresses) of virtual functions, and (2) logical link decisions, i.e., logical links between service traffic sources, service VF PoPs, and service traffic destinations, and respective resource requirements. A one-to-many connection of PoPs may be due to computing resource constraints at Network Functions Virtualization (NFV) enabled nodes or bandwidth constraints over network links.

Different packet transport networks use different schemes to route traffic over the data plane. For example, some packet transport networks use source routing protocols that allow a sender of a packet to partially or completely specify the pathway over which the packet is transported through the network. Other packet transport networks use non-source routing protocols to switch packets on a link-by-link basis such that en-route nodes are responsible for determining at least a portion of the pathway over which the packet is transported through the network. Different routing schemes may offer different advantages and disadvantages for different network scenarios. For example, source routing protocols may offer low complexity, while non-source routing protocols may provide better overall network performance.

When networks use different schemes to route traffic over the data plane, a network logical topology is determined for each service. This includes decisions related to VF PoPs (based on respective computing resource requirements such as CPU, memory, storage, and I/O interfaces), and local link decisions (logical links between service traffic sources, service VF PoPs, service traffic destinations, and respective quality of service (QoS) requirements such as rate, latency, and jitter). The network logical topology determined for each service is called Service-level SDT.

When networks use different schemes or methods to route traffic over the data plane, a network logical topology is determined for each individual service session (a group of traffic flows). This includes determining logical paths in the network logical topology defined by the Service-level SDT. Decisions for each individual service session are related to the selection of a set of PoPs, from multiple PoPs through which to route the traffic flow. The network logical topology determined for each individual service session is called Session-level SDT.

A restriction on PoPs is that they are not to exceed their data processing capacity. The PoP processing load is subject to incoming traffic. Packets of the same session can be directed through the same unique PoP of a stateful function (a function that stores information related to the function during that particular session). However, in some instances, packets of the same session must be directed through the same unique PoP of a stateful function, which may further impose processing load on the PoP. There is no way to determine and monitor, for individual sessions, the VF PoPs that need to be traversed through with respect to the limited processing capability of PoPs, in order to avoid PoP overloading and for context maintenance of a function's statefulness.

Therefore there is a need for new systems and methods for SDT management that are not subject to one or more deficiencies in the prior art.

This background information is provided to reveal information believed by the applicant to be of possible relevance to the present invention. No admission is necessarily intended, nor should be construed, that any of the preceding information constitutes prior art against the present invention.

SUMMARY

Embodiments of the present invention provide systems and methods for software defined topology management. Embodiments of the present invention further provide systems and methods for service and session continuity in software defined topology management. In accordance with an aspect of the present disclosure, a method for migration of a session from a first user plane function (UPF) to a second UPF. The method includes selecting, by the session management component, the second UPF for communication with a User Equipment (UE). The method further includes sending, by the session management component, instructions for instantiation of a network path from the UE to the second UPF and sending instructions to an access node communicative with the UE, to migrate the session from the first UPF to the second UPF.

In accordance with another aspect of the present disclosure there is provided a device having a processor and machine readable memory storing machine executable instructions which when executed by the processor configure the device to perform the above method.

In accordance with another aspect of the present disclosure there is provided a computer program product including a non-transitory computer readable medium storing computer executable statements and instructions thereon that, when executed by a computer, perform operations for migration of a session from a first user plane function (UPF) to a second UPF, the operations including operations as defined in the above method.

Another aspect of the disclosure, there is provided a Session-level SDT component in the control plane to handle setup, recovery and mobility of individual session requests in real time.

Another aspect of the disclosure provides a method for configuring a data plane of a network, the method comprising configuring an end-to-end service through one or more nodes of the network, receiving a request for a session utilizing the end-to-end service, and establishing a path for the session utilizing path management (PM) configured for session level software defined topology.

In some embodiments, the path is established through nodes hosting virtual functions. In some embodiments, the virtual functions are stateless and the method includes the path management monitoring session status and updating the path of the session as needed and responsive to the monitoring. In some embodiment, the control plane component includes an extended network address translation component which includes a session ID for packets for which network address translation is required when the established path crosses network boundaries.

The foregoing and other objects, features, aspects and advantages of the present invention will become more apparent from the following detailed description, taken in conjunction with the accompanying drawings which description is by way of example only.

BRIEF DESCRIPTION OF DRAWINGS

For a more complete understanding of this disclosure, reference is now made to the following brief description, taken in connection with the accompanying drawings and detailed description, wherein like reference numerals represent like parts.

DETAILED DESCRIPTION

It has been realized that there is no Session-level Software Defined Topology (SDT) designed within conventional communication networks to address stateful constraints on traffic flows and logical pathway selections. Moreover, there is need for a Session-level SDT in conjunction with Service-level SDT, when a point of presence (PoP) of a virtual function (VF) is connected to multiple PoPs of the next VF (as can be defined in a service function chain).

Embodiments provide system architectures and methods for software defined topology management interworking with network function virtualization (NFV) and software defined networking (SDN) at the service level (Service-level SDT) and session level (Session-level SDT).

In embodiments, the purpose of adapting Session-level SDT is to change the points of presence of stateful functions that an existing flow traverses, while the Service-level SDT decision remains unchanged. The Session-level SDT may be triggered by unacceptable service performance decrease caused by stateful function PoP overloading. The Session-level SDT may reduce the cost or impact of migrating session state information between PoPs, where migration can rely upon dedicated control channels or data plane peer-to-peer flows between PoPs.

Figure 1:
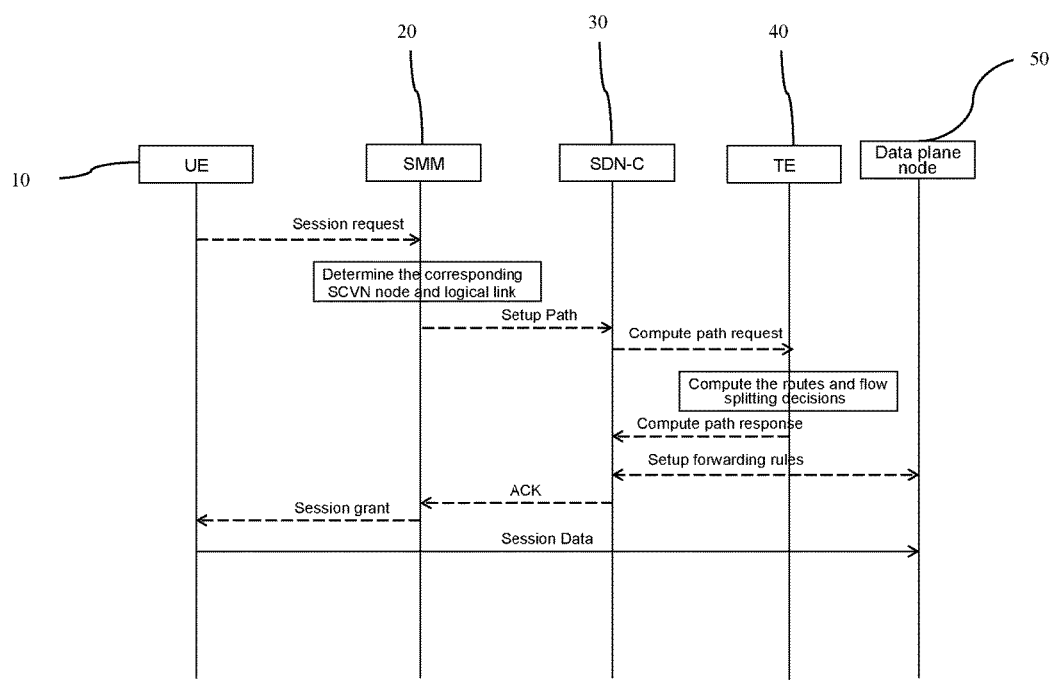
FIG. 1 schematically illustrates a signaling diagram of typical session-level management procedure in SONAC.

An example signaling diagram of typical session-level management is schematically illustrated in FIG. 1, according to an embodiment. The diagram includes user equipment (UE) 10 which sends a session request to the session/mobility manager (SMM) 20 function, where a corresponding service customized virtual network (SCVN) node and logical link is determined. Once the setup path is determined the software defined networking controller (SDN-C) 30 computes the path request, and a traffic engineering component (TE) 40 computes the routes and flow splitting decisions. The computed path response is sent back to the SDN-C and the setup of forwarding rules are sent to the SDN-C and the data plane node 50. The SDN-C acknowledges (ACK) the receipt of a setup of the path to the SMM, which in turn grants the session to the UE for transmission of session data.

In one embodiment, it is contemplated that a session is a semi-permanent end-to-end dialog that is required to visit multiple VF instances for state collection or maintenance. The requirement for Session-level SDT comes from the VFs and is stated in the service request as part of the VF descriptor. Session management, including mobility-oriented session management (as well as logical pathway selection) in long term evolution (LTE), is defined as session state management that is brought about by the presence of state function control (SFC). Even if all sessions are stateless, session management may still be required from an operation standpoint for, but not limited to, load balancing and complexity reduction.

According to embodiments of the present invention, there is provided a method and apparatus for the migration of a session from a first user plane function (UPF) to a second UPF. During the migration of a UE's PDU session from a first UPF to a second UPF a UE is only connected to a single UPF at a time. Accordingly, upon receipt of a trigger for migration, a network path from the UE to a second UPF is instantiated in advance of the migration of the session. Upon completion of the migration of the uplink and downlink transmissions to the second UPF, the PDU resources which instantiated the first UPF can be released for use elsewhere. A network path defines a collection of links between components of a communication network that communicatively connect a first device and a second device. For example, a network path can communicatively connect a UE and a first UPF, thereby providing for a session therebetween.

Figure 2:
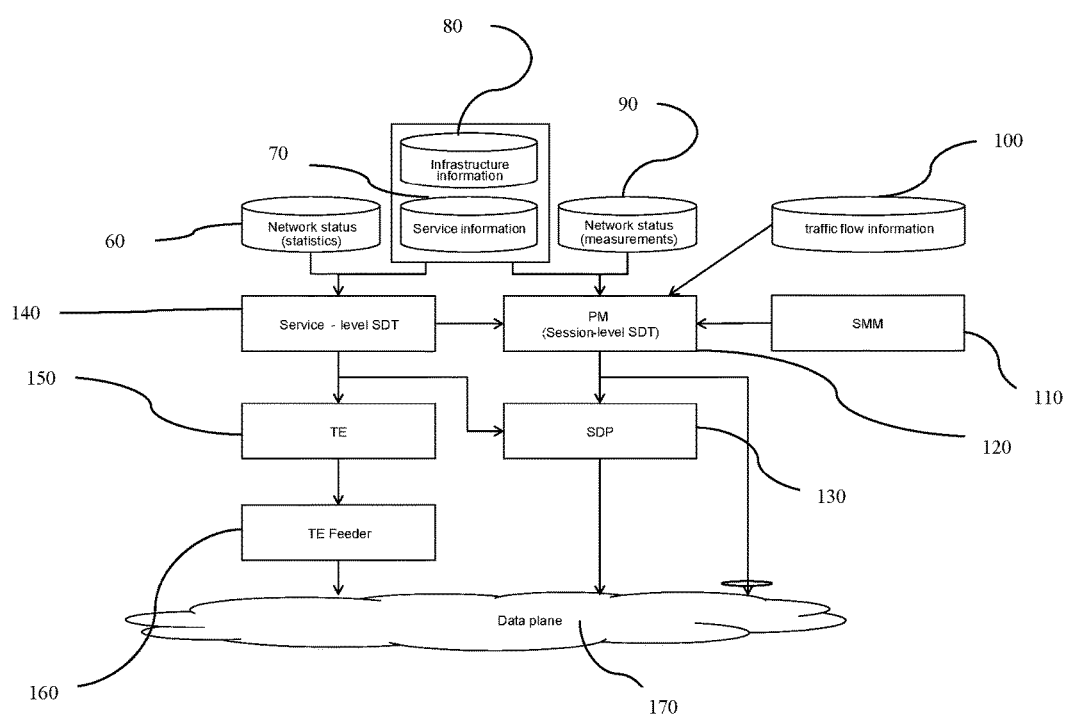
FIG. 2 schematically illustrates session management system architecture in the two-level path configuration in accordance with embodiments of the present invention.

An example of a session management system architecture in a two-level path configuration is schematically illustrated in FIG. 2, according to an embodiment. The diagram includes infrastructure information 80 and service information 70 (including but not limited to, function statefulness information per session, and per device UE) which is divided into the network status for statistics 60 and the network status for measurements 90. Network status includes, but is not limited to data center (DCs, which can be gateway nodes, border nodes or NFV PoPs) resource availability and loading. The network status statistics are utilized by the Service-level SDT 140 to make decisions, which are passed to a path management (PM) 120 component (Session-level SDT), software defined protocol (SDP) 130 and TE 150. The TE makes a decision based on the Service-level SDT decision, which is passed to the traffic engineering feeder (TE Feeder) 160, which forwards the determined service level rules to the data plane 170. Beyond the Service-level SDT decisions, the PM also receives traffic flow information 100, and session information from the session/mobility manager (SMM) 110. The PM then relays signal content, including but not limited to session identification information, logical link information and respective quality of service requirements, to the SDP and the data plane. The SDP is determined by both the Service-level SDT and the PM, and the customized protocol is relayed to the data plane for session activation.

In some embodiments, the SMM can be decomposed into a session management function (SMF) and an access and mobility management function (AMF). While the SMF and the AMF are configured as separate components, the individual function of the SMF and the AMF and the interaction between the AMF and the SMF can provide the functional equivalent of the SMM. In these embodiments, the SMF is configured to manage operation of the communication network having regard to session perspective, while the AMF is configured to manage operation of the communication network having regard to user equipment (UE) network access and UE mobility.

Figure 3:
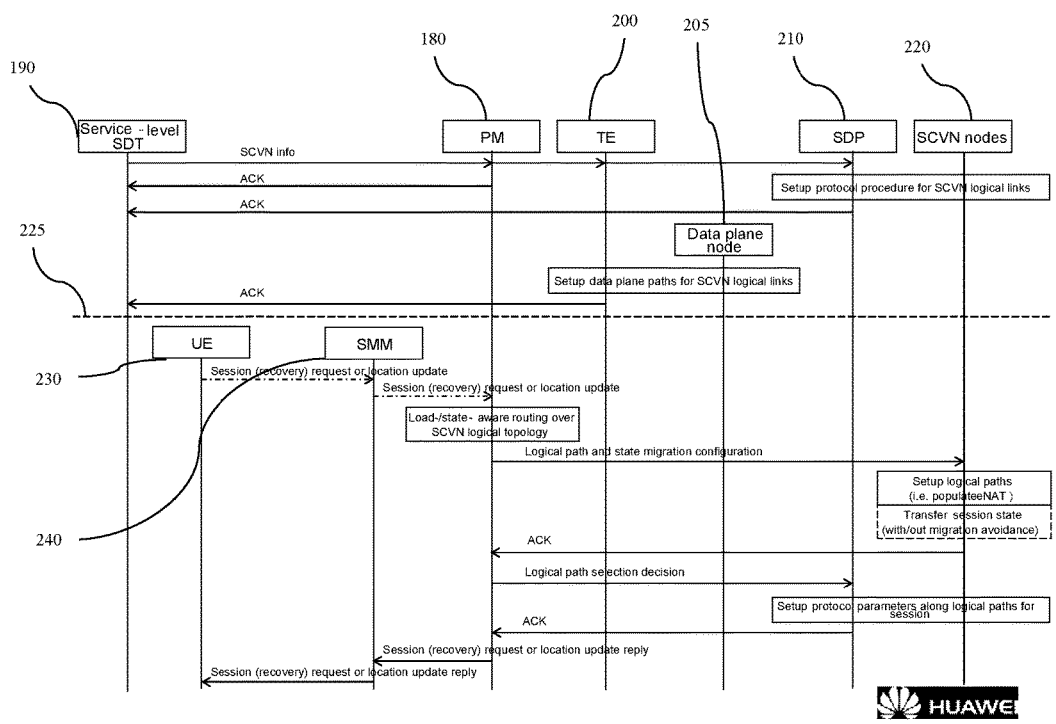
FIG. 3 illustrates a session management signaling diagram in the two-level path configuration in accordance with embodiments of the present invention.

An example of session management signaling in a two-level path configuration is illustrated in FIG. 3, according to an embodiment. The diagram includes the Service-level SDT 190 signaling as illustrated above the cross-sectional horizontal dotted line 225, and the Session-level SDT signaling as illustrated below the cross-sectional horizontal dotted line 225. The Service-level SDT passes SCVN information to a path management (PM) 180 component which performs Session-level SDT, and returns an acknowledgement to the Service-level SDT. The SCVN information is also passed along to the TE 200, which forwards onto the SDP 210 and also coordinates with the data plane node 205 to setup data plane paths for the SCVN logical links before returning an acknowledgment to the Service-level SDT. The SDP takes SCVN information from the TE and then sets up the protocol procedure for the SCVN logical links, and provides it to the SCVN nodes 220. The SDP also returns an acknowledgment to the Service-level SDT. Service-level SDT signaling will be complete at this point. Upon an optional session request, including but not limited to a session recovery request from UE 230, the SMM 240 will relay the session request to the PM which has awareness of the load, statefulness and routing over the SCVN logical topology, and makes a logical path selection and state migration configuration decision which is passed onto the SCVN nodes. The logical pathway is then setup, and the session state may be transferred to another SCVN node if required; migration avoidance is not utilized in this session state transfer. An acknowledgment is returned to the PM, which makes a logical path selection decision and returns that decision to the SDP. Setup protocol parameters along the logical path for the session is set and provided to the SCVN nodes. Acknowledgement is returned to the PM, which returns a session request result or location reply to the SMM, which passes on the session request result or location reply to the UE.

In some embodiments, setting up the logical pathway can including populating enhanced network address translation (ENAT), which can be an ENAT table or database to be accessed by an ENAT function. It is contemplated that the Session-level SDT will interact with ENAT at the SCVN node. ENAT acts to configure the data plane to support the Session-level SDT output to establish logical links among data centers (DCs) at the SCVN node, and to enable information packets to reach virtual function (VF) instances within a DC. DCs may include multiple nodes and functions and may have private addressing schemes. A DC may be physically located within an operator's network or in communication with the operator's network, but may or may not be run by the operator.

For example, an ENAT function can be configured to allow for communication between one or more DC gateways (within a DC Network) and one or more border nodes of an Operator's network. The DC network and the Operator's network can use different addressing schemes. However an ENAT function can allow for communication to flow despite these different addressing schemes. As an example, both the DC network and the Operator's network can include their own controller(s), which can host the NFV-C and SDN-C functions. In some embodiments, an ENAT function can be configured for each DC Gateway or Border node, however in other embodiments an ENAT function only needs to be configured for DC Gateways or the Border nodes, wherein the ENAT function provides the forwarding translations. For embodiments in which an ENAT function is to be configured at DC gateway, the DC network controller can configure the ENAT function based on input from the NFV-C. That is, the operator's NFV-C communicates the configuration to the DC network controller, which then configures the ENAT function at the DC gateways.

Figure 4:
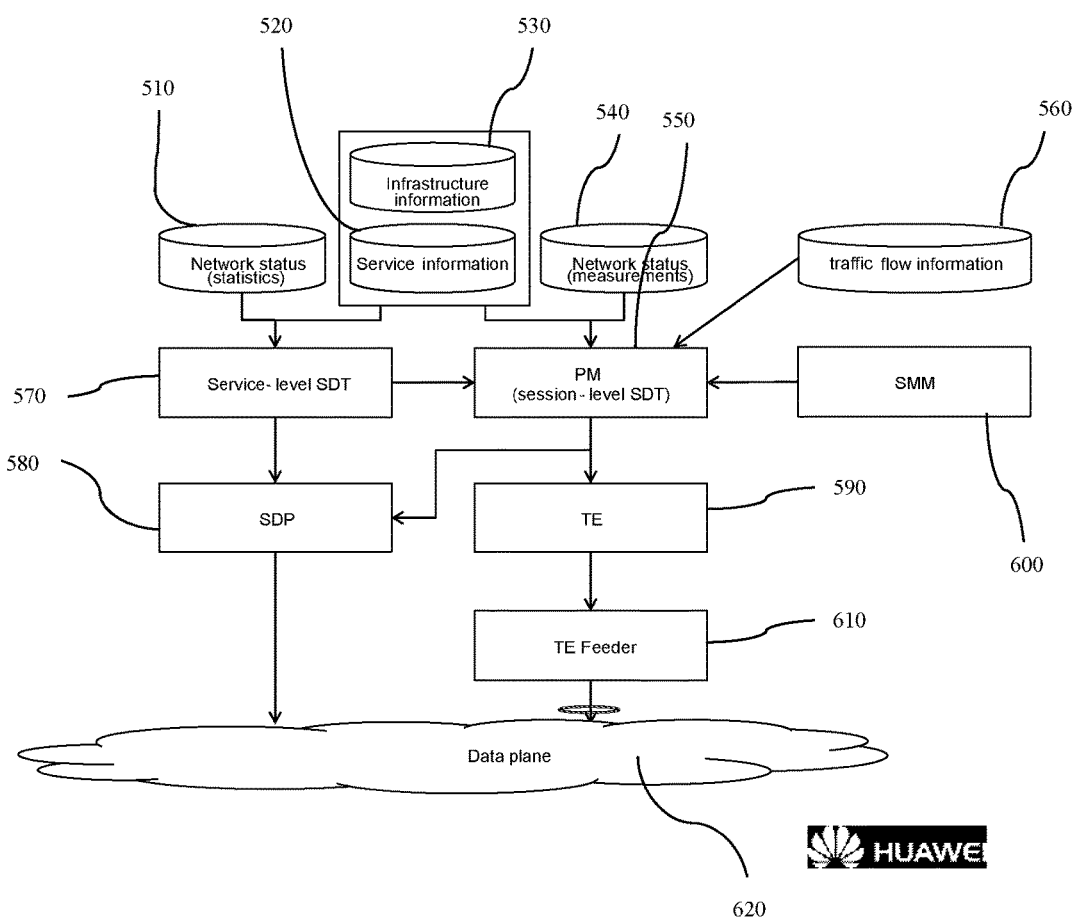
FIG. 4 schematically illustrates session management system architecture in the one-level path configuration in accordance with embodiments of the present invention.

An example of session management system architecture in a one-level path configuration is schematically illustrated in FIG. 4, according to an embodiment. The diagram includes infrastructure information 530 and service information 520 (including but not limited to, function statefulness information per session, and per UE) which is divided into the network status 510 for statistics and the network status 540 for measurements. Network status includes, but is not limited to DC resource availability and loading. The network status statistics are utilized by the Service-level SDT 570 to make decisions, which are passed to the PM 550, and SDP 580. The SDP (after also receiving a Session-level SDT decision from the PM) then passes protocol customization directly to the data plane 620. Beyond the Service-level SDT decisions, the PM also receives traffic flow information 560, and session requests from the SMM 600. In some embodiments, the SMM can be decomposed into the session management function (SMF) and the access and mobility management function (AMF). The PM then relays signal content, including but not limited to session identification information, logical link information and respective quality of service requirements, to the SDP and the and TE 590. The TE makes a decision based on the Service-level SDT decision, which is passed to the TE Feeder 610. The TE Feeder then forwards the determined service level rules to the data plane. In this one-level path configuration, each time the session is updated, the TE re-establishes each SCVN node within the session level.

Figure 5:
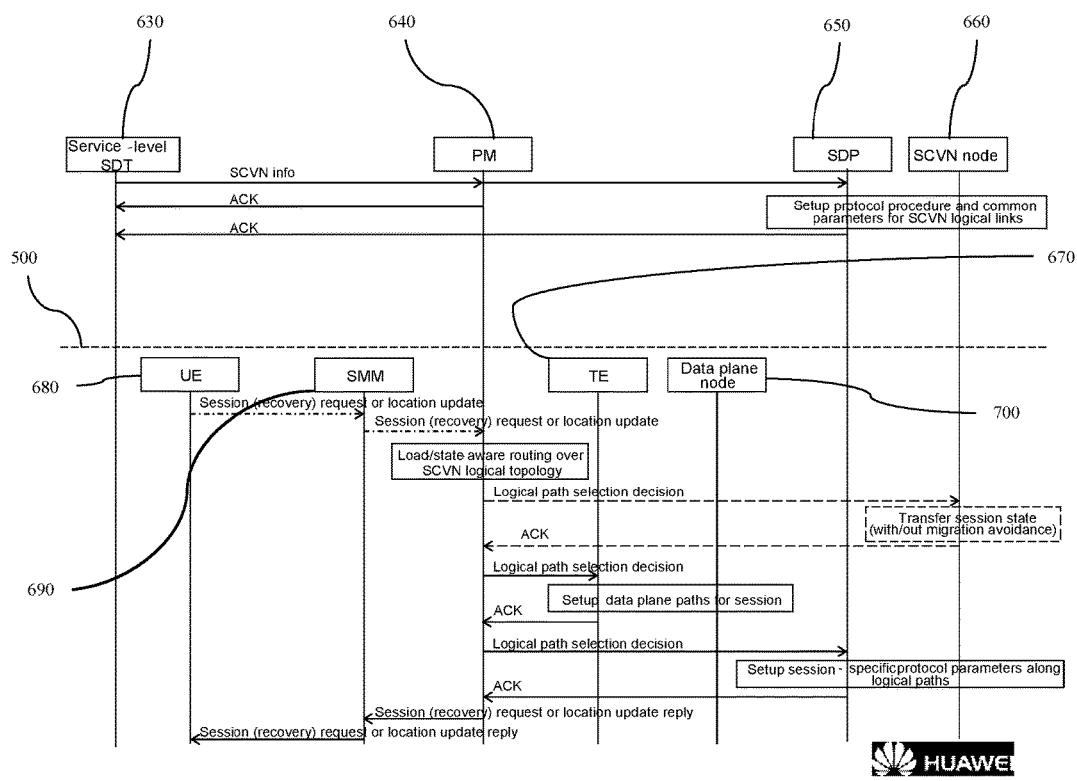
FIG. 5 illustrates a session management signaling diagram in the one-level path configuration in accordance with embodiments of the present invention.

An example of session management signaling in a one-level path configuration is illustrated in FIG. 5, according to an embodiment. The diagram includes the Service-level SDT signaling as illustrated above the cross-sectional horizontal dotted line 500, and the Session-level SDT signaling as illustrated below the cross-sectional horizontal dotted line 500. The Service-level SDT 630 passes SCVN information to the PM 640, which performs Session-level SDT, and returns an acknowledgment to the Service-level SDT. The SCVN information is also passed along to the SDP 650, which takes SCVN information and sets up the protocol procedure and common parameters for the SCVN logical links, and provides this information to the SCVN nodes 660. The SDP also returns an acknowledgment to the Service-level SDT. Service-level SDT signaling will be complete at this point. Upon an optional session request or location update, including but not limited to a session recovery request from UE 680, the SMM 690 will relay the session request or location update to the PM which has awareness of the load, statefulness and routing over the SCVN logical topology. The PM may make a logical path selection which is passed onto the SCVN nodes. The SCVN node may transfer the session state (with or without migration avoidance) and return an acknowledgment to the PM. The PM then makes a logical pathway selection and sends that selection to the TE 670. The IL then sets up the data plane paths for the data plane node 700, and returns an acknowledgment to the PM. The PM then makes another logical path selection which is passed to the SDP, where session-specific protocol parameters along logical paths are setup and passed onto the SCVN node. The SDP returns an acknowledgement to the PM, which in turn returns the session request result or location update to the SMM, and onto the UE.

In one embodiment, it is contemplated that the Session-level SDT decision will have a defined lifecycle. The decision regarding a stateful function, for example the Session-level SDT function remaining in an active state, may remain effective until the session terminates. Such a session normally corresponds to a data transaction in the application layer. Hence, the Session-level SDT decision related to PoPs normally remain static when all the virtual network functions (VNFs) are stateful unless the Service-level SDT decision is changed, or some PoP is extremely overloaded (causing unacceptable performance drop at the application layer). The decision regarding a stateless function may change as necessary before the session terminates. This will depend on the loading of the PoPs of the function. As long as the stateless function is involved, the Session-level SDT decision related to PoPs may be changed.

In another embodiment, it is contemplated that ENAT is extended to perform session level translation and in some instances can be termed as extended ENAT. Such translation will support non-address based forwarding at the session level and consequently establish logical links between VFs at the session level. For an outgoing DC packet, the information map (comprising the DC internal address and the session ID) will pair to the outgoing logical link. For an incoming DC packet, the information map will connect the incoming logical link to the DC-internal address. In this embodiment, the ENAT performs service level translation as a special case of session level translation where the session ID is equal to the service ID; the service ID and local session ID are configured together so both the service ID and session ID can be understood.

According to one embodiment, Table 1 below illustrates tables for packet information organization for the extended ENAT at a DC. In particular, Table 1 outlines the extended enhanced network address translation at data center address-based forwarding, and non-address-based forwarding in accordance with embodiments of the present invention. Within these packets, a logical link may be expressed as a pair, including network ID and local logical links address. The type of cast expressed within the packet is optional if multi-casting, any-casting, or broadcasting addresses are allocated. Incoming address-based forwarding packets may include destination address, DC-internal address(es) and the type of cast. Outgoing address-based forwarding packets may include session ID and source address, destination address(es), and the type of cast. Incoming traffic of non-address-based forwarding packets may include logical link (LL), DC-internal address(es), and the type of cast. Outgoing traffic of non-address-based forwarding packets may include session ID and source network address, LLs, and the type of cast.

TABLE 1

| Address-based | | |
|---|---|---|
| Table for incoming packets | | |
| Dest. Address | DC-Internal Address(es) | Type of Cast** |
| Table for outgoing packets | | |
| (Session ID, Src. Address) | Dest. Address(es) | Type of Cast |
| Non-Address-based | | |
| Table for incoming traffic | | |
| Logical Link (LL)* | DC-Internal Address(es) | Type of Cast |
| Table for outgoing traffic | | |
| (Session ID, Source Network Address) | LL(s) | Type of Cast |

*A logical link can expressed as a pair of network ID and local logical link ID
**Type of Cast is optional if multi-casting, any-casting, broadcasting addresses are allocated.

In one embodiment, it is contemplated that the extended ENAT will interact with Session-level SDT for migration avoidance purposes. When the existing VNFs become overloaded by traffic load or the processing requirements of the VNFs associated with the traffic load increases, more VNFs may be instantiated VNFs to split or spread the load over a larger number of VNF instances. This may be considered a migration avoidance method and is often referred to as scaling out. When the number of VNF instances is reduced for the purpose of contraction during underutilization thereof, migration avoidance methods are also utilized; this can be referred to as scaling in. In order to achieve migration avoidance, all processing switches or at least some processing switches (both hardware and software) can act in concert in order to ensure that a flow is directed to the VNF instance that maintains the state needed to process that flow; this can be referred to as dynamic scaling. For a dynamic scaling instance such as scaling out, an overload detector detects when a VNF instance is overloaded and then notifies the system wide controller. Placement decisions, which determine where (e.g. on which server cores or within which server) new VNF instances should be placed can be initiated. Then there is creation of new VNF instances (implemented as any of processes, containers, or VMs) at specified cores as determined by the placement component. The remaining step for dynamic scaling is to configure the network to direct traffic to the appropriate VNF instances. In some embodiments, migration avoidance may only be applied at stateful VNFs, and most VNFs are stateful (i.e. processing a particular packed depends on state established by the arrival of previous packets in that flow or aggregate of flows). Therefore VNFs require affinity, where traffic for a given flow or aggregate of flows has to reach the instance of the VNF that has access to that flow's state. For example, if there are multiple instances of NAT VNF, then a packet should be sent to the NAT instance that maintains the address mapping for the flow associated with the packet (or with the NAT instance maintaining the address mapping for the packet itself). This technique only requires that the flow ID can be computed based on information available at the switch, such as the packet's header fields. When a VNF instance is replicated, its input traffic will be split in a manner that preserves the VNF's affinity requirement.

In one embodiment, it is contemplated that the extended ENAT can be used as a virtual switch in the migration avoidance technique for redirecting new flows arriving at the old VNF instance, to new VNF instances for processing. The paths for flow re-direction may be provisioned by TE dynamically, or in a preconfigured manner while old flows continue to be processed at the old VNF. As old flows diminish to some degree, the forwarding rules for the remaining old flows can be reconfigured and the respective state migration can be performed. When the extended ENAT is used for migration avoidance as described, there is benefit in the savings related to state migration as well as the savings of forwarding rule configuration. The virtual switch is lower cost in comparison to sending packet flow to a completely new node. This can be useful in the session management architecture in a one-level path configuration, where TE is carried out on a per-session or per-flow level.

According to one embodiment, Table 2 below illustrates tables for packet information organization for the extended ENAT at DC with migration avoidance rules. In particular, Table 2 outlines the extended enhanced network address translation at data center address-based forwarding, and non-address-based forwarding in accordance with embodiments of the present invention. Within these packets, a logical link for flow redirection may have a globally unique ID. Incoming address-based packets with migration avoidance rules may include destination and session ID (including flow ID), and new destination information. Incoming non-address-based packets with migration avoidance rules may include LL and session ID (including flow ID), and a new LL.

TABLE 2

Address-based forwarding

Table for incoming packets (migration avoidance rules)

| (Destination, session ID [, flow ID] ) | New Destination |
|---|---|

Non-Address-based forwarding

Table for incoming traffic (migration avoidance rules)

| (LL, session ID [, flow ID] ) | New LL * |
|---|---|

* A logical link for flow redirection may have a globally unique ID

According to one embodiment, Table 3 below illustrates benefits of a session level SDT component in the control plane to handle individual session recovery requests in real time. Table 3 also illustrates differences in TE problem complexity, operation and signaling overhead when comparing two-level path configuration and one-level path configuration. In theoretical terms, the one-level path configuration, although of higher complexity and requiring higher TE operation and signaling overhead, may be able to better optimize the decision made in the logical path selection.

TABLE 3

Example benefits of Session-level SDT

|  | with session-level SDT | without session-level SDT |
|---|---|---|
| SDT/TE modularity | YES | NO |
| SDT/TE independent evaluation | YES | NO |
| TE backward compatibility | YES | NO |

Architecture design comparison

|  | Option 1 (two-level path configuration) | Option 2 (one-level path configuration) |
|---|---|---|
| TE problem complexity | Low | High |
| TE operation frequency | Low | High |
| Signaling overhead | Low | High |

In one embodiment it is contemplated that the Session-level SDT can be avoided by enforcing a tree-based logical topology (singular hierarchy pathway for decision making, instead of a mesh-based multiple pathway decision making topology) in the Service-level SDT decision making. Imposing a tree-based logical topology may come at the cost of higher complexity and performance as the Service-level SDT becomes complicated due to additional binary variables associated with the PoPs. The system performance may drop due to inefficient use of network resources, as a large amount of traffic concentrates on a single PoP while multiple PoPs are desired for load balancing over links and DCs.

In another embodiment, it is contemplated that the Session-level SDT may be detected in different ways depending on the configuration. In the two-level path configuration the data plane routers receive logical-link-based forwarding rules (at the physical node level) and the SCVN node receives session-based internal node level forwarding rules. In the one-level path configuration the data plane routers receive session-based forwarding rules.

Figure 6:
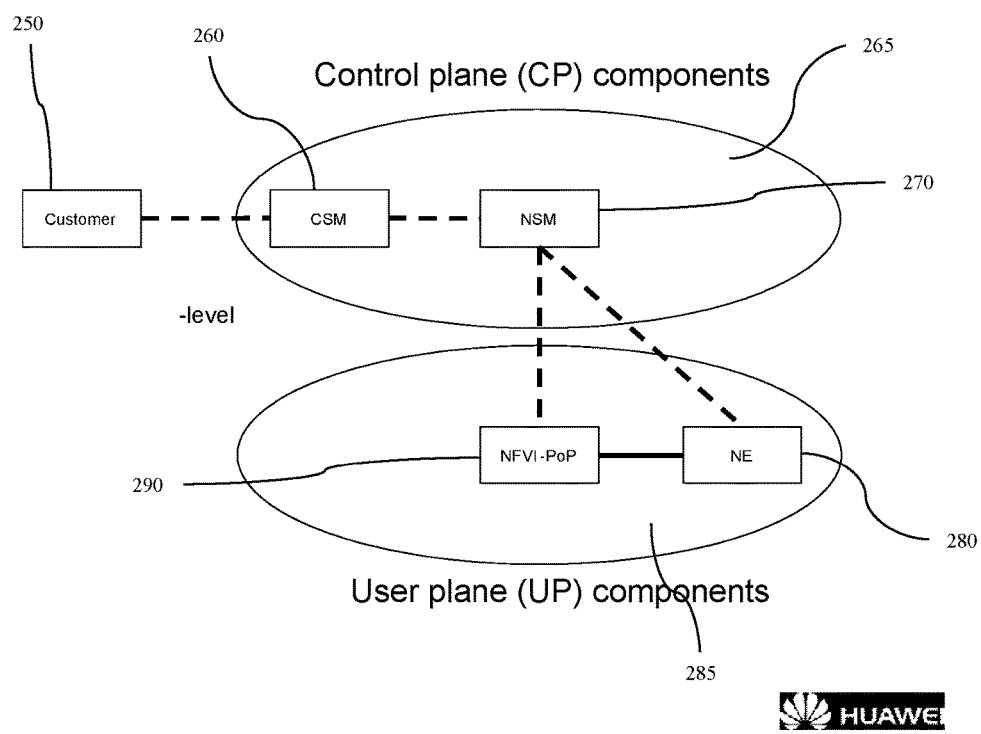
FIG. 6 schematically illustrates the architecture support for network slicing.

An example of a schematic illustration of the architecture support for network slicing is illustrated in FIG. 6, according to an embodiment. Network slicing refers to a technique for separating different types of network traffic which can be used in reconfigurable network architectures, such as networks employing Network Function Virtualization (NFV). A network slice (as defined in 3GPP TR 22.891 entitled "Study on New Services and Markets Technology Enablers") is a collection of logical network functions that supports the communication service requirements of a particular network service. One use of network slicing is in the core network. Through the use of network slicing, different service providers can have distinct core networks that run on the same physical set of network and computing resources. This can also be used to create a virtual network dedicated to particular types of network traffic. It should be understood that this discussion is not intended to exclude the application of network slicing as it applies to the radio access edge of the Radio Access Network (RAN), which may need specific functionality to support multiple network slices or partitioning of resources for different network slices. In order to provide performance guarantees, the network slices can be isolated from each other so that one slice does not negatively affect the other slices. The isolation is not restricted to different types of services, but also allows the operator to deploy multiple instances of the same network partition. The schematic does not include the SDP, TE and TE Feeder components. The customer 250, may optionally connect to customer service manager (CSM) 260, which in turn may connect with the network slice manager (NSM) 270; the NSM functions at the service level. Both of the CSM and the NSM are control plane (CP) 265 components. The NSM may then optionally connect with both the network function virtualization infrastructure point of presence (NFVI-PoP) 290 and a network element (NE) 280. The NE and NFVI-PoP are connected and both considered user plane (UP) 285 components.

Figure 7:
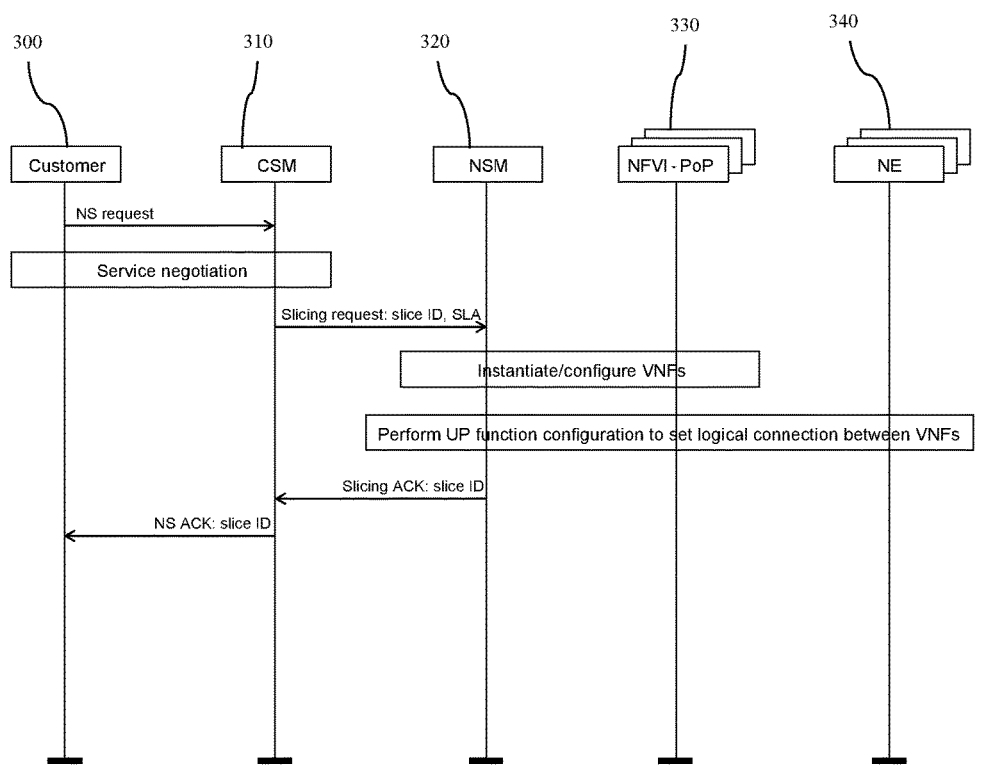
FIG. 7 illustrates a slice composition procedure signaling diagram in accordance with embodiments of the present invention.

An example of the composition procedure for network slicing is illustrated in the signaling diagram FIG. 7, according to an embodiment. This diagram includes a new service (NS) request from a customer 300 to a CSM 310. Service negotiation is competed between the customer and the CSM before a slicing request (which includes provision of a slice ID and service level agreement (SLA)) is sent to the NSM 320. The NSM then initiates and configures the VNFs with the NFVI-PoP 330, before performing user plane function configuration to set logical connections between the NSM, NFVI-PoP and NE 340. The NSM then sends the slicing request result acknowledgement (including the slice ID) to the CSM, which in turn sends the NS result acknowledgement (which also includes the slice ID) to the customer. In this way, service level network slicing may be performed.

Figure 8:
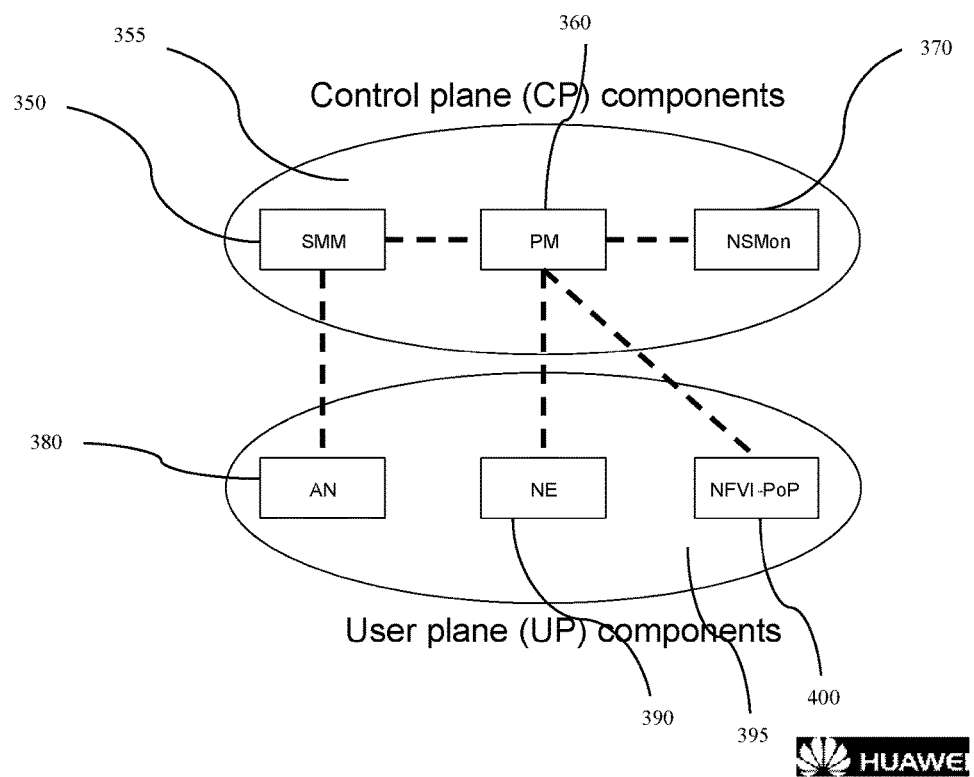
FIG. 8 schematically illustrates the architecture support for session management in accordance with embodiments of the present invention.

An example of a schematic illustration of the architecture support for session management is illustrated in FIG. 8, according to an embodiment. This illustration includes some CP 355 components, including the session/mobility manager (SMM) 350, path management (PM) 360, and the network slice monitor (NSMon) 370. The SMM may connect to the PM, while it also may connect with an access node (AN) 380. The NSMon may also connect with the PM. The PM may also communicate with the network element (NE) 390 and the network function virtualizations infrastructure point of presence (NVFI-PoP) 390. The AN, NE and NFVI-PoP are user plane (UP) 395 components.

Figure 9:
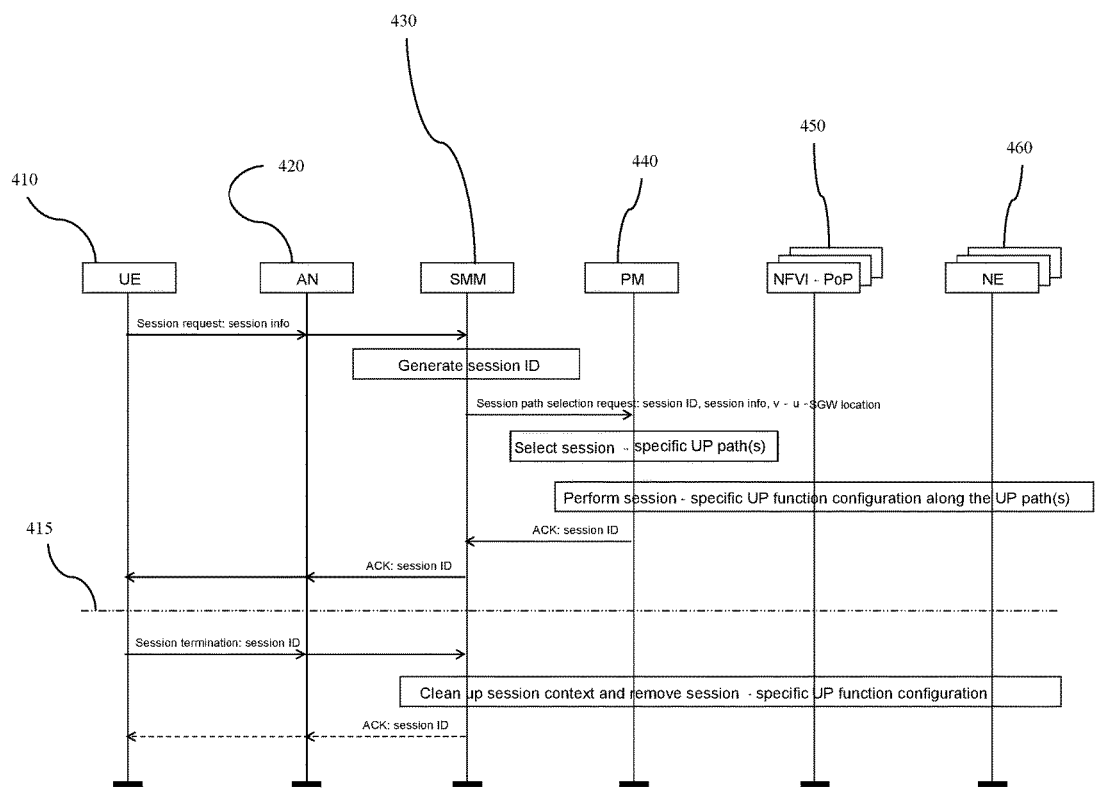
FIG. 9 illustrates a session establishment and teardown signaling diagram in accordance with embodiments of the present invention.

An example of session establishment and teardown is illustrated in the signaling diagram FIG. 9, according to an embodiment. Session establishment is illustrated above the cross-sectional horizontal dotted line 415, and session teardown is illustrated below the cross-sectional horizontal dotted line. The user equipment (UE) 410 sends a session request (which includes session information) to an access node (AN) 420. The AN then sends the session request to the session/mobility manager (SMM) 430, which generates a session ID and sends a session path selection request (which includes the provision of session ID, session information, and virtual-user-service gateway (v-u-SGW) location) to the path management (PM) 440. The PM then selects the session specific user plane (UP) paths and performs session specific UP function configuration along the UP paths at the network function virtualizations infrastructure point of presence (NFVI-PoP) 450 and network element (NE) 460. The PM then returns acknowledgement (including the session ID) to the SMM, which in turn returns acknowledgement to the AN and the UE. When the session teardown occurs, session termination request (including session ID) is sent from the UE to the AN, and onto the SMM. The SMM cleans up the session context and removes the session specific UP function configuration across the PM, NFVI-PoP and NE. The SMM then may return acknowledgment (including the session ID) to the AN and onto the UE.

Figure 10:
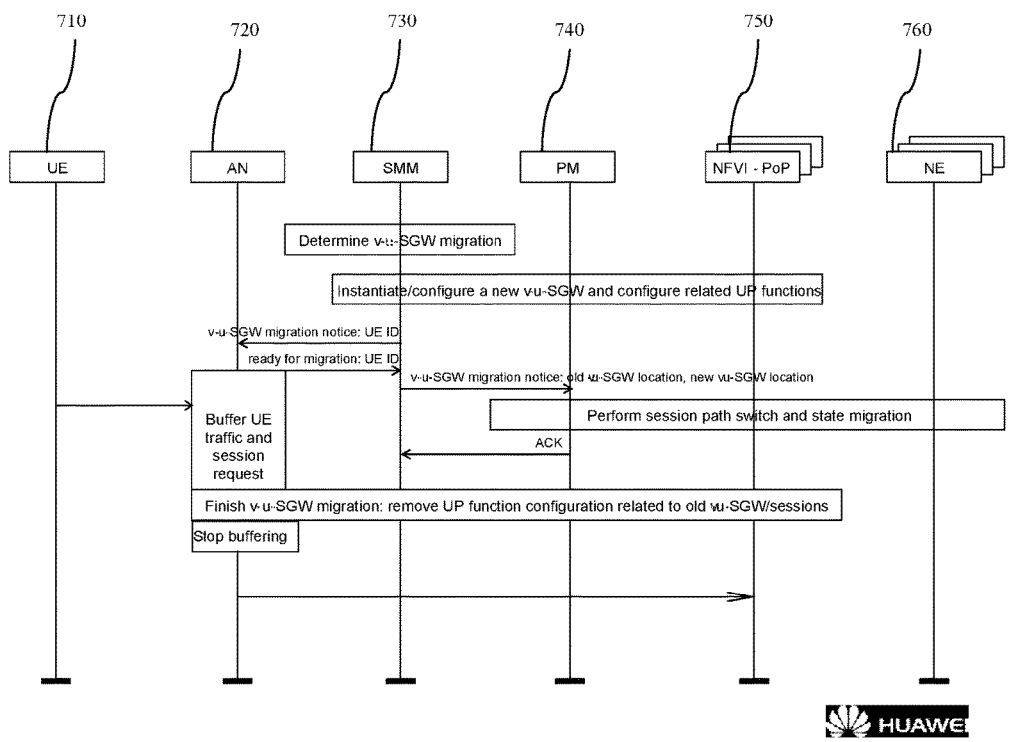
FIG. 10 illustrates a session management with v-u-SGW migration signaling diagram in accordance with embodiments of the present invention.

An example of session management with v-u-SGW migration is illustrated in the signaling diagram FIG. 10, according to an embodiment. In some embodiments, the SMM 730 may be decomposed into the session management function (SMF) and the access and mobility management function (AMF). Initially, the SMM 730 determines v-u-SGW migration. For example the SMM can determine whether the terminating user plane function (TUPF) assigned to the current UE's 710 protocol data unit (PDU) session needs to be redirected or migrated based on UE mobility, local policies or other parameters as would be readily understood. As an example, a parameter for the determination of migration may be based on information about the serving area of the assigned TUPF. It is understood that in embodiments, the term terminating user plane function (TUPF) can be a user plane gateway or a user plane function (UPF) or a NFVI-PoP or a v-u-SGW or other network function with similar functionality. The SMM 730 can initiate or configure a new v-u-SGW and configure related UP functions across the PM 740 and NFVI-PoP 750. The SMM then sends a v-u-SGW migration notice (including a UE ID) to the AN 720, which when ready for migration, will return the migration notice to the SMM. From the SMM, the v-u-SGW migration notice (which includes the old v-u-SGW location, and the new v-u-SGW location) is passed onto the PM. The PM performs a session path switch and state migration across the NFVI-PoP and the NE 760, before returning acknowledgment to the SMM. As the migration notice moves through the SMM, PM, NFVI-PoP and NE, the AN will buffer UE 710 traffic and the session request. The AN will then finish v-u-SGW migration by removing the UP function configuration related to old v-u-SGW and session across the SMM, PM and NFVI-PoP, before the AN stops buffering. During this migration process the UE 710 remains connected to the AN 730 which connected to the NFVI-PoP 750.

According to embodiments, the redirection or migration procedure from a first TUPF to another TUPF can include the following steps. Initially the network can redirect the UE's traffic to a different TUPF by first releasing the user plane path associated with the current TUPF. Subsequently, the network sets up a user plane path corresponding to the new TUPF. In some embodiments, the UE's PDU session is preserved when reallocating the TUPF. In some embodiments, the network disconnects the UE's PDU session corresponding to the current TUPF and requests the UE to reactivate the PDU session immediately thereby resulting in the selection of a new TUPF. According to embodiments selection of a new TUPF suitable for the migration can be based on other information, for example network status information, traffic flow information, user equipment location, UE's mobility, determination of an overloading condition at the existing TUPF (e.g. overloading of the current UPF) and an external trigger from an application function or management function.

Figure 11:
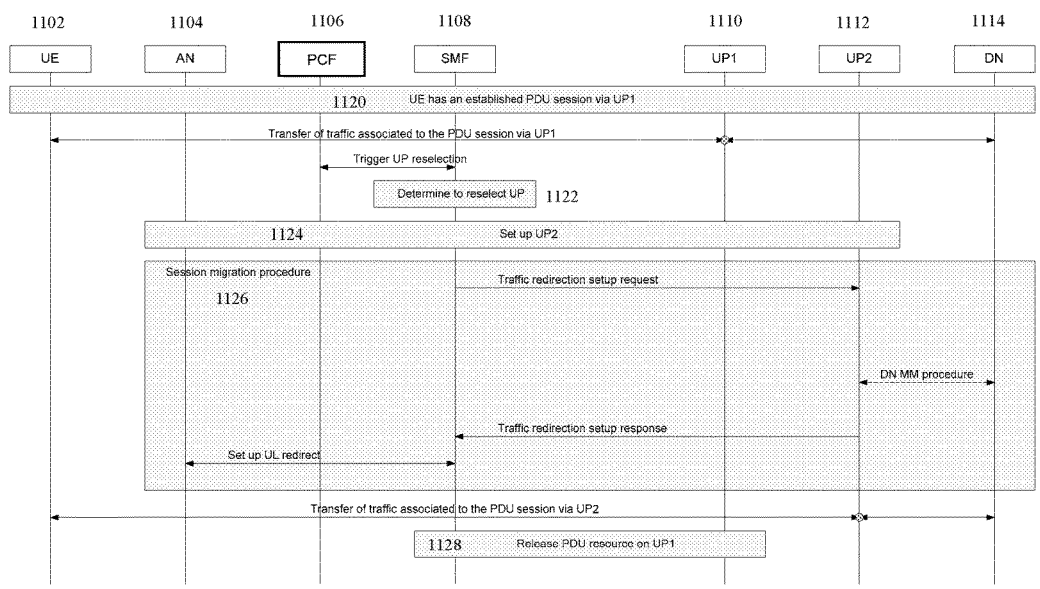
FIG. 11 illustrates a session management migration signaling diagram for migration from a first user plane function (UPF) to a second UPF, in accordance with embodiments of the present invention.

FIG. 11 illustrates the migration of a session from a first UPF to a second UPF in accordance with embodiments of the present invention. In this embodiment, the migration of a UE's PDU session from a first UPF to a second UPF is provided, however a UE is only connected to a single UPF at a time. Prior to any action being taken for the migration from a first UPF to a second UPF, there is an understanding that the UE 1102 has an established PDU session 1120 with a first UPF 1110. According to some embodiments, the session management function (SMF) 1108, which may be the SDN-C associated with the session level SDT or similar function, receives a UPF reselection notification which triggers UPF reselection. This reselection notification may be a policy change notification received from the policy control function (PCF) 1106. In other embodiments, the reselection notification can be a handover notification that is received from the access and mobility management function (AMF), which may be a mobility management function (MMF) or similar function. In other embodiments, the reselection notification can be an external request which is received from a network exposure function (NEF). In another embodiment, the reselection notification can be an internal decision that has been made by the SMF. Upon receipt of this reselection notification the SMF 1108 determines 1122 or evaluates the UPF to which migration of the current UE PDU session is to occur. Upon this determination, the SMF proceeds to setup 1124 the second UPF 1112 for communication with the UE 1102 wherein the access node 1104 becomes ready to receive downlink (DL) traffic from the second UPF 1112.

With further reference to FIG. 11, the SMF 1108 subsequently initiates the session migration procedure 1126. The SMF sends a traffic redirection setup request to the second UPF 1112 to setup the DL traffic handling for the UE's PDU session. The request can include the information of the first UPF 1110, for example the IP address of the IP anchor function of the first UP gateway. In some embodiments, upon receipt of the request the second UPF can commence the upper level mobility procedures in the data network (DN) 1114. For example this procedure can be actions that would be performed with respect to UE movement in mobile IP. When completed, the second UP gateway 1112 sends a response to the SMF 1108 indicating that DL traffic handling setup has been completed. The SMF 1108 notifies the AN 1104 which is communicative with the UE, to commence the use of the second UPF for the transfer of uplink (UL) traffic. At this point the SMF 1108 initiates the release 1128 of the PDU resources that were being used at first UPF 1110 for the session, as the migration of that session has been completed.

According to embodiments, the SMF is configured as a session management component that utilizes real computer resources or virtual computer resources or both, in order to provide the functionality of the SMF. It is understood that such computer resources utilize, at a hardware level, a set of one or more microprocessors operatively coupled to a corresponding set of memory components which include stored program instructions for execution by the one or more microprocessors. According to some embodiments the session management component is configured to operate as a separate control plane function.

Figure 12:
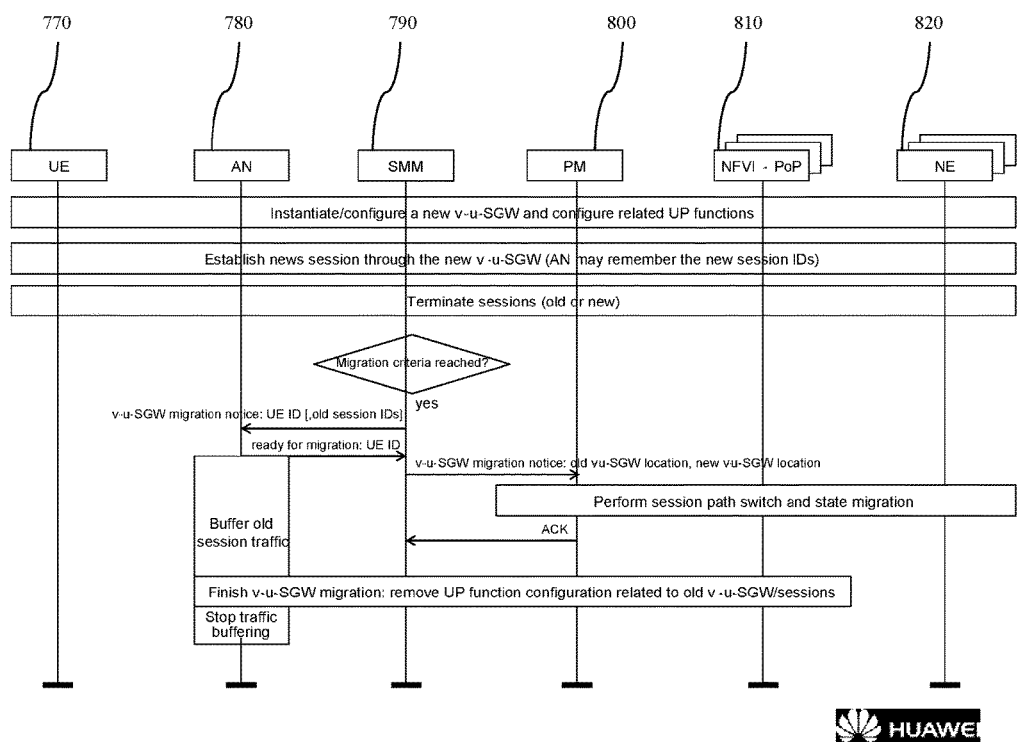
FIG. 12 illustrates a session management with v-u-SGW migration avoidance signaling diagram in accordance with embodiments of the present invention.

An example of session management with v-u-SGW migration avoidance is illustrated in the signaling diagram FIG. 12, according to an embodiment. There is initiation and configuration of a new v-u-SGW, and a configuration of related UP functions across the UE 770, AN 780, SMM 790, PM 800, NFVI-PoP 810, and NE 820. Next, a new session is established through the new v-u-SGW (the AN may remember the new session ID) across the UE, AN, SMM, PM, NFVI-PoP, and NE. Then the old or new session is terminated across the UE, AN, SMM, PM, NFVI-PoP, and NE. The SMM then decides if the migration criteria have been reached. If it is decided so, the v-u-SGW migration notice (including the UE ID and old session IDs) is sent to the AN. When ready for migration, the AN will return the migration notice to the SMM. From the SMM the v-u-SGW migration notice (which includes the old v-u-SGW location, and the new v-u-SGW location) is passed onto the PM. The PM performs a session path switch and state migration across the NFVI-PoP and the NE, before returning acknowledgement to the SMM. As the migration notice moves through the SMM, PM, NFVI-PoP and NE, the AN will buffer UE traffic and the session request. The AN will then finish v-u-SGW migration by removing the UP function configuration related to old v-u-SGW and session across the SMM, PM and NFVI-PoP, before the AN stops buffering.

Figure 13:
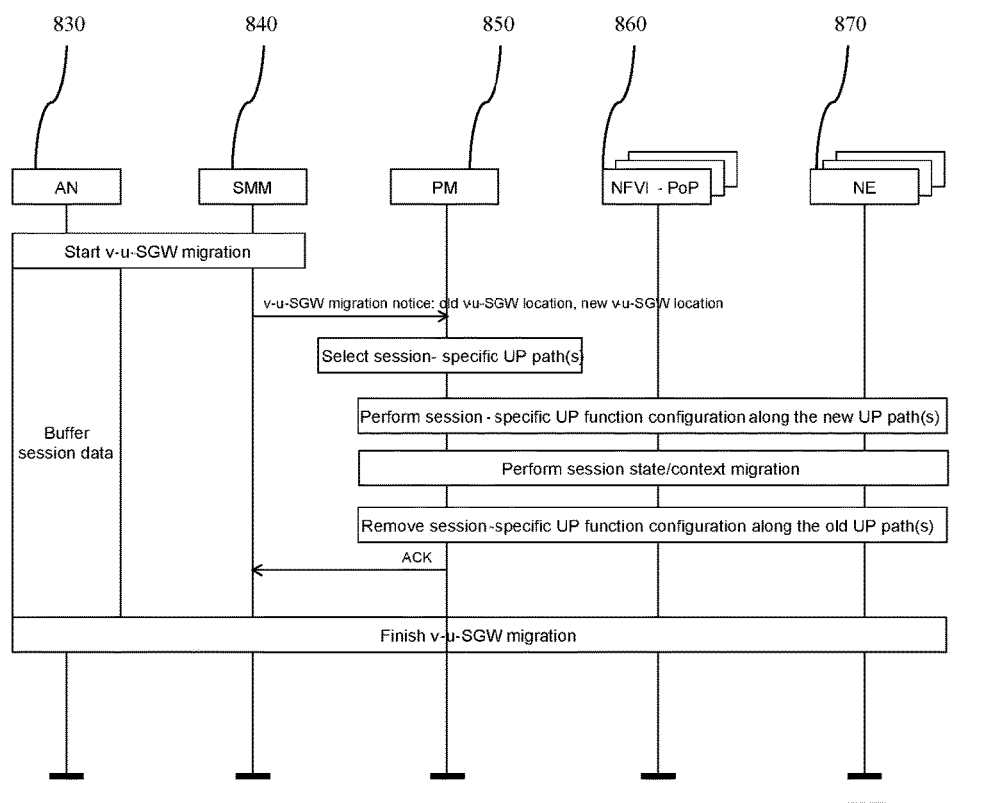
FIG. 13 illustrates a session path switch due to v-u-SGW migration signaling diagram in accordance with embodiments of the present invention.

An example of session path switching due to v-u-SGW migration is illustrated in the signaling diagram FIG. 13, according to an embodiment. Once the AN 830 initiates the v-u-SGW migration with the SMM 840, it will buffer the session data while the migration takes place through other components. The SMM will send a v-u-SGW migration notice (which includes the old v-u-SGW location, and the new v-u-SGW location information) onto the PM 850. The PM will then select the session-specific UP paths, and perform session-specific UP function configuration with the NFVI-PoP 860 and NE 870 along the new UP paths. Next, session state or session context migration is performed by the PM, NFVI-PoP, and NE, which also remove the session-specific UP function configuration along the old UP paths. Once this is complete the PM returns acknowledgement to the SMM, and the AN stops buffering the session data to finish the v-u-SGW migration across the AN, SMM, PM, NFVI-PoP, and the NE.

Figure 14:
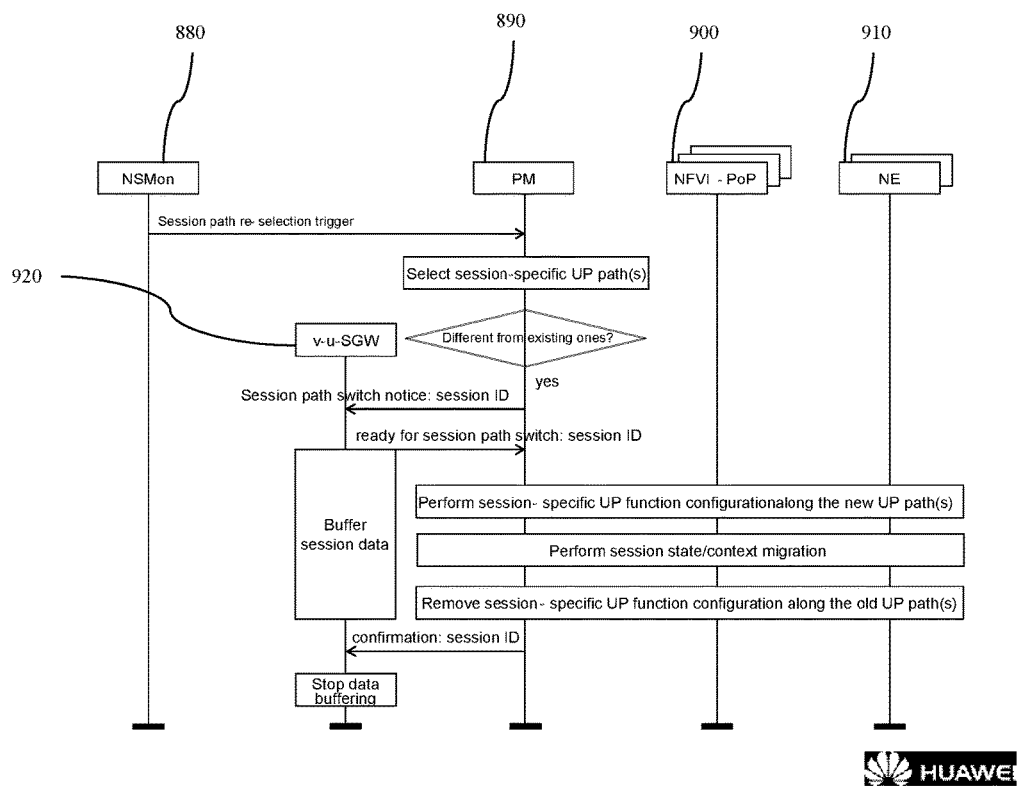
FIG. 14 illustrates a session path switch due to loading signaling diagram in accordance with embodiments of the present invention.

An example of session path switching due to loading is illustrated in the signaling diagram FIG. 14, according to an embodiment. A session path reselection trigger is sent from the new session monitor (NSMon 880) to the PM 890. The PM then selects session-specific UP paths and determines if these paths are different from the existing paths. If the paths are different, the PM sends a session path switch notice (which includes a session ID) to the v-u-SGW 920. The v-u-SGW returns that a session path switch is ready (including the session ID) to the PM, and begins to buffer the session data while the session path switch request is processed through the PM, NFVI-PoP 900, and NE 910. The PM will then perform session-specific UP function configuration along the new UP paths with the NFVI-PoP and NE, before performing the session state or configuration migration across the same components. Next, the session-specific UP function configuration along the old UP paths is removed along the PM, NFVI-PoP, and NE, before the PM returns confirmation (including the session ID) to the v-u-SGW. At this point the v-u-SGW stops data buffering, and the session path switch due to loading is complete.

Figure 15:
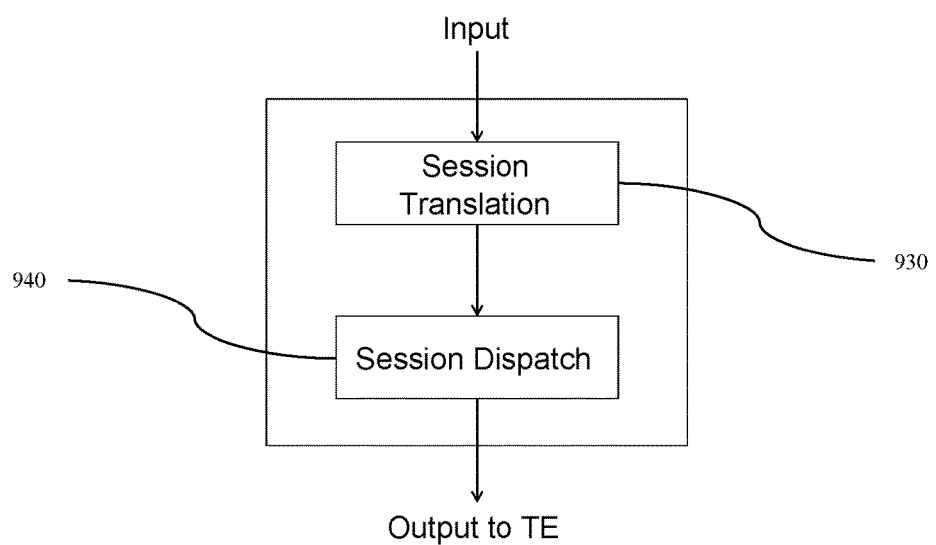
FIG. 15 schematically illustrates the flow-level software defined topology in accordance with embodiments of the present invention.

An example of the flow-level software defined topology is illustrated in FIG. 15, according to an embodiment. The diagram includes an input which flows into session translation 930, which flows into dispatch of the session 940, eventually outputting to the TE.

In one embodiment, it is contemplated that the session translation will be comprised of session segmentation and session segmentation detailing. The session segmentation in an end to end session may be session segments, separated by stateful functions. Each segment may have a function as a source and a stateful function as destinations. The two flow ends of the segment are regarded as stateful functions and each segment has a convergent constraint. Within the session segment detailing, the session segment is a collection of anycast flows. Each anycast flow starts from a distinct PoP of the source end function and ends at all the PoPs of the target end function. The session segment's convergence constraint is applied to the collection of anycast flows. The anycast flows of two adjacent sessions segments may be connected by a connection constraint at common function PoPs.

An example of the flow dispatch as represented in multi-variable equations is illustrated in Equation Set 1 below, according to an embodiment. Equation Set 1 is a MCF problem variant where a maximum concurrent flow formulation is based on the logical topology computed by service-level SDT, assuming no VNFs change traffic rate.

EQUATION SET 1

$$\text{maximize} \min_{a>=0, b\in\{0,1\}} \min_{f\in F} \frac{a_f}{d_f}$$

Link capacity: $\sum_{f\in F} a_f(u, v) \le c(u, v), \forall (u, v) \in E$

Flow conservation: $\sum_{u \ne s_f, (u,w)\in E} a_f(u, w) = \sum_{v \notin t_f, (w,v)\in E} a_f(w, v),$ $\forall w \in R, \forall f \in F$ $\sum_{(s_f, u)\in E} a_f(s_f, u) = \sum_{t\in t_f} \sum_{(v,t)\in E} a_f(v, t) = a_f, \forall f \in F$ Flow connection: $\sum_{g\in Prev(f): s_f \in t_g} \sum_{(u, s_f)\in E:} a_g(u, s_f) = \sum_{(s_f, v)\in E} a_f(s_f, v),$ $\forall f \in F$ Flow convergence: $\sum_{(v,p)\in E} a_f(v, p) \le M b_p^f, \forall f \in F: p \in t_f,$ $\forall p \in P^\phi, \forall \phi \in \Phi$ $\sum_{p\in P^\phi} b_p^f = 1, \forall \phi \in \Phi, \forall f \in F$ DC capacity: $\sum_{f\in F} \sum_{(v,p)\in E} a_f(v, p) \le r_p, \forall p \in P$ Flow satisfaction: $a_f \le d_f, \forall f \in F$ where: $E$ is a logical link set $F$ is a translated flow set $P^\phi$ is a stateful VNF PoP set $\varepsilon^\Phi$ is a statful VNF set $M$ is a very large constant $P$ is a total NVF PoP set $r_p$ is data processing capacity An example of the adapting Session-level software defined topology in a multi-variable equation is illustrated in Equation 2 below, according to an embodiment. This problem formulation is obtained by extending the session dispatch problem formulation with migration cost minimization, assuming dedicated control channels for state migration. This formulation is based on the logical topology computed by service-level SDT, assuming no VNFs change traffic rate.

EQUATION 2

$$\text{maximize} \min_{a>=0, b\in\{0,1\}} \min_{f\in F} \frac{a_f}{d_f} - \sum_{f\in F} \sum_{\phi\in\Phi} \sum_{p\in P^\phi} b_p^f w_\phi^f \rho(p_\phi^f, p)$$

where: $w$ is a amount of state function $f$ is a migration cost factor between PoPs $p$ is a current function PoP associated with the session According to certain embodiments, all of the depicted elements may be utilized, or only a subset of the elements. Further, the processing system may contain multiple instances of certain elements, such as multiple processors, memories, or transceivers.

In embodiments, it is contemplated that in cooperation with third party service providers, an application server can be deployed in an operator's network to provide third party services with critical requirements on bandwidth and delay for the users nearby. The mobile network may be able to automatically and dynamically control and allocate network resources, such as but not limited to setting up, capacity expansion or contraction, and removal of network function. The capacity of networks elements may be flexibly adjusted based on variation of demand. Existing mechanisms such as but not limited to load balancing, and network function, which are closely related to network scalability will be enhanced; resiliency against network congestion and disasters will be enhanced through this added flexibility.

Further details of solutions to enabling selection and reselection of efficient user plane paths are included as Appendix A, which is incorporated by reference herein in its entirety.

Figure 16:
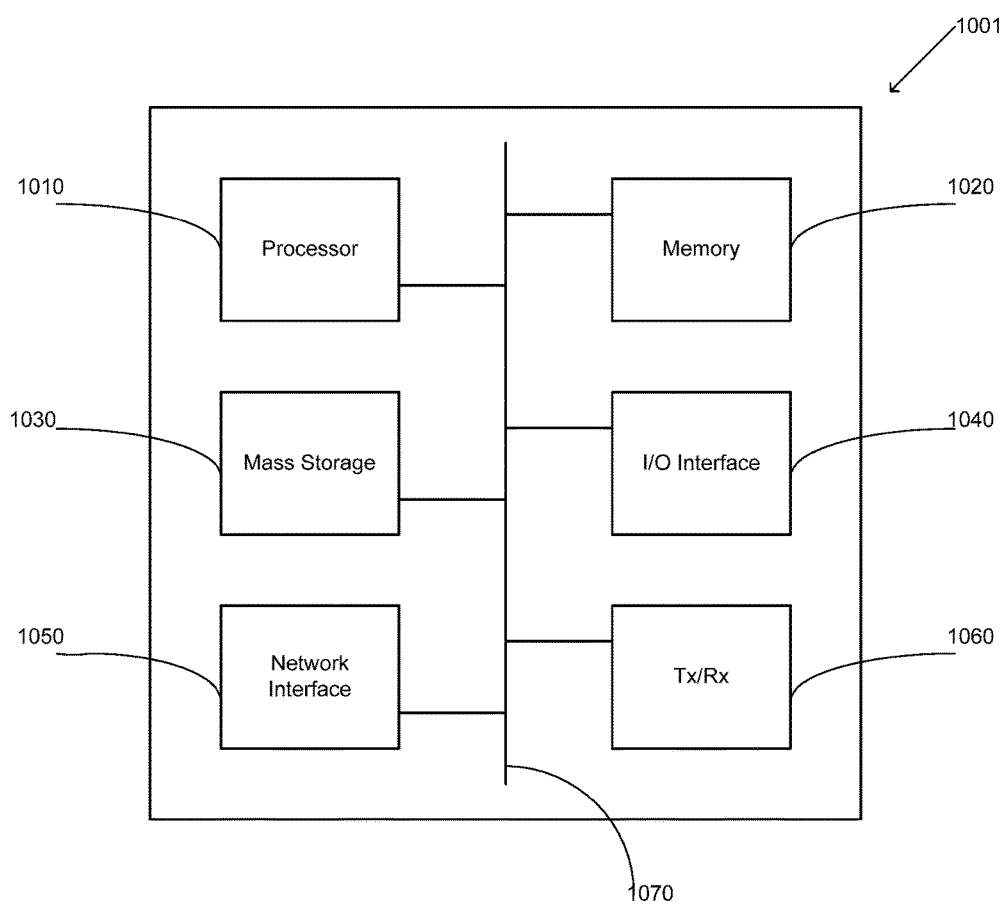
FIG. 16 illustrates a node at which one or more SDT components, SDN components and session management components can be instantiated in accordance with embodiments of the present invention.

FIG. 16 is a block diagram of a processing system or device 1001 that may be used for implementing the various network elements which instantiate the SDT and SDN components, for example the session management component. As shown in FIG. 16, processing system or device 1001 includes a processor 1010, working memory 1020, non-transitory storage 1030, network interface, I/O interface 1040, and depending on the node type, a transceiver 1060, all of which are communicatively coupled via bi-directional bus 1070.

According to certain embodiments, all of the depicted elements may be utilized, or only a subset of the elements. Further, the processing system or device 1001 may contain multiple instances of certain elements, such as multiple processors, memories, or transceivers. Also, elements of processing system or device 1001 may be directly coupled to other components without the bi-directional bus The memory may include any type of non-transitory memory such as static random access memory (SRAM), dynamic random access memory (DRAM), synchronous DRAM (SDRAM), read-only memory (ROM), any combination of such, or the like. The mass storage element may include any type of non-transitory storage device, such as a solid state drive, hard disk drive, a magnetic disk drive, an optical disk drive, USB drive, or any computer program product configured to store data and machine executable program code. According to certain embodiments, the memory or mass storage have recorded thereon statements and instructions executable by the processor for performing the aforementioned functions and steps.

According to embodiments, the memory or the mass storage or both, store machine executable instructions which when executed by the processor, configure the processing system or device to migrate a session from a first UPF to a second UPF. The executable instructions upon execution by the processor can also configure the processing system or device to select a second UPF for communication with a UE, and send instructions for instantiation of a network path from the UE to the second UPF. In addition, the executable instructions, upon execution by the processor can also configure the processing system or device to send instructions to an access node communicative with the UE, to migrate the session from the first UPF to the second UPF. In some embodiments, the executable instructions, upon execution by the processor can configure the processing system or device to send instructions for releasing network resources associated with the first UPF.

Through the descriptions of the preceding embodiments, the present disclosure may be implemented by using hardware only or by using software and a necessary universal hardware platform. Based on such understandings, the technical solution of the present disclosure may be embodied in the form of a software product. The software product may be stored in a non-volatile or non-transitory storage medium, which can include a compact disk read-only memory (CD-ROM), flash memory, or a removable hard disk. The software product includes a number of instructions that enable a computer device (computer, server, or network device) to execute the methods provided in the embodiments of the present disclosure. For example, such an execution may correspond to a simulation of the logical operations as described herein. The software product may additionally or alternatively include number of instructions that enable a computer device to execute operations for configuring or programming a digital logic apparatus in accordance with embodiments of the present disclosure.

Various embodiments of the present disclosure utilize real and/or virtual computer resources. Such computer resources utilize, at a hardware level, a set of one or more microprocessors operatively coupled to a corresponding set of memory components which include stored program instructions for execution by the microprocessors. Computing resources may be used to provide virtual computing resources at one or more levels of virtualization. For example, one or more given generic computer hardware platforms may be used to provide one or more virtual computing machines. Computer hardware, such as processor resources, memory, and the like, may also be virtualized in order to provide resources from which further virtual computing machines are built. A set of computing resources which are allocatable for providing various computing resources which in turn are used to realize various computing components of a system, may be regarded as providing a distributed computing system, the internal architecture of which may be configured in various ways.

Although the present disclosure has been described with reference to specific features and embodiments thereof, it is evident that various modifications and combinations can be made thereto without departing from the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

APPENDIX A

Title: Solution to enabling (re)selection of efficient user plane path

Abstract

This paper proposes a solution to the key issue of enabling (re)selection of efficient user plane. The solution comprises a path management function in CP that performs either state-less path switching or state-ful path switching for an on-going session, whether downlink or uplink. Path switching is triggered by UE mobility management operation; it may also be triggered by network scalability and automation operation (e.g. load balancing) when the latter makes the current UP paths inefficient. The path management function is also used for initial path setup in session management.

The solution is described without assuming network slicing. How to combine it with network slicing is FFS.

1 Introduction

In 5G, application functions may be deployed inside UP and traffic may require not only QoS provisioning but also specific functional treatment by reaching those functions. This future scenario has been recognized by the 3GPP in TR 22.864, as referenced below.

The following description is taken from TR 22.864 (cp.[1], clause 5.2.1): In cooperation with $3^{rd}$ party service providers, the application server can be deployed in an operator's network to provide $3^{rd}$ party services, e.g. UHD video, with critical requirements on bandwidth and delay for the users nearby, and the operator network needs to ensure efficient data path between end-user and server to address the service requirements on bandwidth and delay. In critical communication scenarios such localized real-time control and industrial automation, an extremely restricted requirement of reliability and latency is expected to guarantee the communication between e.g. a robot and a local robot-control system, and an efficient data transfer is required even if e.g. the robots move in the smart factory area.

Based on the above consideration, the efficient user plane path use case defined in TR 22.864 [1] includes the following potential requirements:

- Subject to the service agreement between the operator and the service provider, the 3GPP network shall enable hosting of services (including both MNO provided services and $3^{rd}$ party provided services) closer to the end user to improve user experience and save backhaul resources.
- The 3GPP network shall be able to support routing of data traffic to the entity hosting services closer to the end user for specific services of a UE.
- The 3GPP network shall support efficient user-plane paths between a UE and the entity hosting the service closer to the end user even if the UE changes its location during communication.

Moreover, in TR 23.799 (cp. [2], clause 5.5) the key issue of enabling (re)selection of efficient user plane paths include the following study items:

- Reselection of user-plane paths between UEs attached to the same network when the previous paths become inefficient.
- Reselection of user-plane path between a UE attached to the mobile network and communication peers outside of the mobile network (e.g. Internet hosts) when the previous path becomes inefficient.

- Reselection of user-plane path between a UE and a service hosting entity residing close to the edge (including the radio access network) when the previous path becomes inefficient.
- Minimising impact to the user experience (e.g. minimisation of interruption time and loss of packets) when changing the anchoring point for some or all packet data connections of a UE.
- Interactions with session management, session continuity and/or mobility management framework.

The following description is taken from TR 22.864 (cp.[1], clause 5.2.1): It is important that the mobile network is able to automatically and dynamically control and allocate the network resources, such as setting up, capacity expansion/contraction and removal of the network function. The capacity of network elements could be flexibly adjusted based on the variation of demand. Moreover, the existing mechanisms (e.g. load balancing, network function selection) which are closely related to the network scalability need to be enhanced. Resiliency against congestion and disasters would be enhanced by such flexibility.

Based on this consideration, the scalability use case defined in TR 22.864 (cp. [1], clause 5.2.2) includes the following potential requirement:

- The 3GPP system shall be able to support the enhancement on the existing mechanisms, e.g. load balancing, network function selection, which are highly related to the network scalability and automation operation.

2  Proposal

Since the network is traditionally considered as a 'data pipe', UP path (re)selection often assumes state-less UP functions (except for the mobility anchor function) and is geared towards connectivity and QoS assurance only. As the $3^{rd}$ party application functions, which may be state-ful (e.g. maintaining session-specific context) are deployed in the network as UP functions, the UP path (re)selection faces new requirements.

For connection-based communication, path (re)selection is performed on a per session basis. The UP path(s) of a session is generally selected with respect to the service function chain (SFC) requirement of the session. If the SFC contains at least one state-ful function, the session is considered state-ful, and state-less otherwise. An SFC can be empty, containing no function. A state-ful session requires connection-based communication where session state or context is maintained, while a state-less session does not. Hence, the notion of 'connection' in session/mobility management is extended to session state consistency.

It is proposed to add the following solution to TR 23.799 to address the key issue of enabling (re)selection of efficient user plane paths and the scalability requirement defined in TR 22.864. The solution proposes a path management function in CP that performs either state-less path switching or state-ful path switching for an on-going session, whether downlink or uplink. Path switching is triggered by UE mobility management operation; it may also be triggered by network scalability and automation operation (e.g. load balancing) when the latter makes the current UP paths inefficient. The path management function is also used for the initial path setup in session management.

It should be noted that

- path switching is possible only when there are multiple candidate paths for a session, which implies that at least one of the UP functions specified in the session's SFC has multiple instances in UP; and,
- path switching may be prevented for short-lived flows to minimize control overhead and session interruption.

The solution is described without assuming network slicing. How to combine it with network slicing is FFS.

6 Solutions

6.x Solution x.y – Path Management with State-ful Requirement

*Editor's Note: It should be indicate here to which issue(s) the solution applies.*

This solution proposes a path management function in CP to perform either state-less path switching or state-ful path switching for an on-going session, whether downlink or uplink. Path switching is triggered by UE mobility management operation (e.g. handover); it may also be triggered by network scalability and automation operation (e.g. load balancing, network function selection) when the latter makes the current UP paths inefficient.

Both state-less switching and state-ful switching configure the UP paths in the network for the on-going session. The state-ful switching procedure additionally satisfies the session's state-ful requirement by either forcing the new UP paths through the same state-ful UP functions, or migrating the session-specific context information to the new paths, or taking both actions in combination.

The function is also used for the initial path setup in session management.

6.x.1 Architecture description

The architecture impact is the introduction of a path management function in CP, as shown in the following diagram.

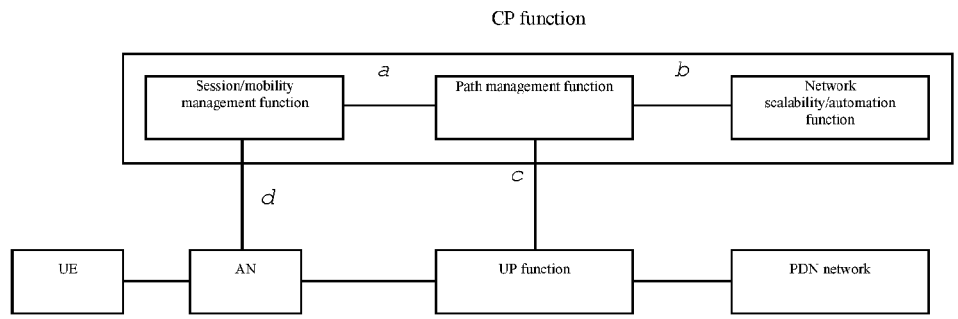

The path management function obtains path-switching trigger or request through the reference points $a$ and $b$; when used for initial path setup in session management, it receives path setup request through the reference point $a$.

The path management function informs or acknowledges the session/mobility management function about path setup/switching through the reference point $a$; it configures path setup/switching and session context migration through the reference point $c$.

The session/mobility management function receives session request and location update through the reference point d; through the same reference point, it configures AN for session path setup/switching and resource allocation.

6.x.2 Function description

Upon a trigger or request from the session/mobility management function or the network scalability and automation function, the path management function for a session (re)selects UP paths and configures UP path switching including session context migration if needed.

When the trigger or request comes from the session/mobility management function, there are two possible cases:

- Case 1: mobility anchor or SGW is determined by the mobility management function In this case, the path-switching trigger or request carries the session ID and the location of the mobility anchor or SGW function. The CP path reselected by the path management function ends or starts there.

- Case 2: mobility anchor or SGW is determined by the proposed path management function In this case, the path-switching trigger or request carries the session ID and the ID of the AN. The CP path reselected by the path management function starts from or ends at the AN and contains a mobility anchor or SGW function.

When path switching is called as a result of network scalability and automation operation, the trigger or request may contain multiple session IDs indicating to perform path switching as needed for those particular sessions. It may also contain no specific session IDs, implying to perform path switching as needed for all sessions.

Regardless of the original of the trigger or request, path switching may lead to session QoS parameter update as the newly selected UP path(s) may have a different capability than the old one(s). In this case, the path management function informs the session/mobility management function about the QoS parameter update, which accordingly configures the AN for resource allocation for the session.

The following signalling flow shows the general procedure of path switching.

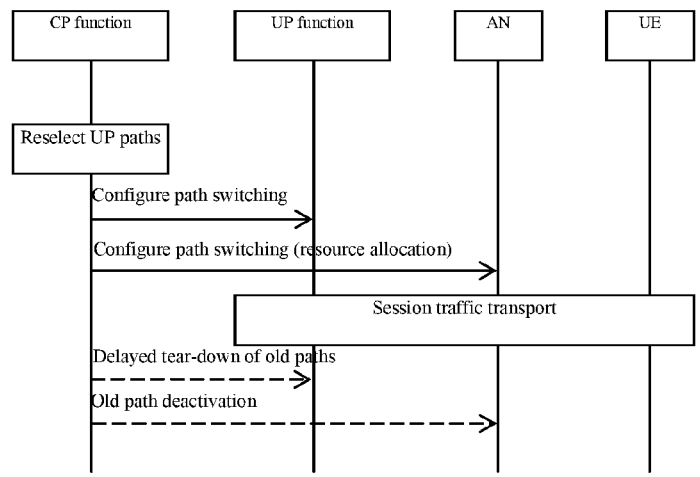

In the diagram, the "delayed tear-down of old paths" step is optional, which allow graceful switching by delaying migration (of traffic and context) to the intermediate silence period to minimize session interruption. It is particularly helpful for intermittent sessions.

The path management function can be used for establishing the initial session path through a similar procedure triggered by a path setup request from the session/mobility management function. In the case of downlink communication and stationary UE, the session's SFC does not necessarily contain mobility anchor function; the path setup request may carry the session ID and the ID of the AN and the selected UP path ends at the AN.

6.x.3  Solution evaluation

- Network impact
  Network elements will receive control signal for UP path setup/switching configuration.

References

[1] 3GPP TR 22.864: "Feasibility Study on New Services and Markets Technology Enablers - Network Operation," February 2016.

[2] 3GPP TR 22.891: "Study on Architecture for Next Generation System," February 2016

What is claimed is:

1. A method for migration of a session from a first user plane function (UPF) to a second UPF, the session being associated with a first network path from a User Equipment (UE) to the first UPF via an access node communicative with the UE, the method comprising:
   selecting, by a session management component, the second UPF for communication with the User Equipment (UE);
   sending, by the session management component, a session redirection setup request to the second UPF, the session redirection setup request including information identifying the first UPF;
   receiving, by the session management component, a response from the second UPF to the session redirection setup;
   sending, by the session management component, instructions for instantiation of a second network path, said path from the UE to the second UPF via the access node; and
   sending, by the session management component, instructions to the access node, to migrate the session from the first UPF to the second UPF.

2. The method according to claim 1, wherein the information indicative of the first UPF includes an internet protocol (IP) address of and IP anchor function associated with the first UPF.

3. The method according to claim 1, wherein prior to selecting the second UPF, a reselection notification is received, wherein the reselection notification is at least one of: a policy change notification, handover notification, an external request, and a decision made by the session management component.

4. The method according to claim 1, wherein selecting the second UPF is performed based on one or more of network status information, traffic flow information, user equipment location, user equipment mobility, determination of an overloading condition at the first UPF and an external trigger from an application function.

5. A device for migration of a session from a first user plane function (UPF) to a second UPF, the session being associated with a first network path from a User Equipment (UE) to the first UPF via an access node communicative with the UE, the device comprising:
   a processor; and
   machine readable memory storing machine executable instructions which when executed by the processor configure the device to:
   select the second UPF for communication with the UE;
   send a session redirection setup request to the second UPF, the session redirection setup request including information identifying the first UPF;
   receive a response from the second UPF to the session redirection setup;
   send instructions for instantiation of a second network path from the UE to the second UPF via the access node;
   send instructions to the access node, to migrate the session from the first UPF to the second UPF; and
   send instructions to release network resources associated with the first UPF.

6. A computer program product comprising a non-transitory computer readable medium storing computer executable statements and instructions thereon that, when executed by a computer, perform operations for migration of a session from a first user plane function (UPF) to a second UPF, the session being associated with a first network path from a User Equipment (UE) to the first UPF via an access node communicative with the UE, the operations comprising:
   selecting, by a session management component, the second UPF for communication with the UE;
   sending, by the session management component, a session redirection setup request to the second UPF, the session redirection setup request including information identifying the first UPF;
   receiving, by the session management component, a response from the second UPF to the session redirection setup;
   sending, by the session management component, instructions for instantiation of a network path from the UE to the second UPF via the access node;
   sending, by the session management component, instructions to the access node, to migrate the session from the first UPF to the second UPF; and
   sending, by the session management component, instructions to releasing network resources associated with the first UPF.

* * * * *